UNITED STATES PATENT OFFICE.

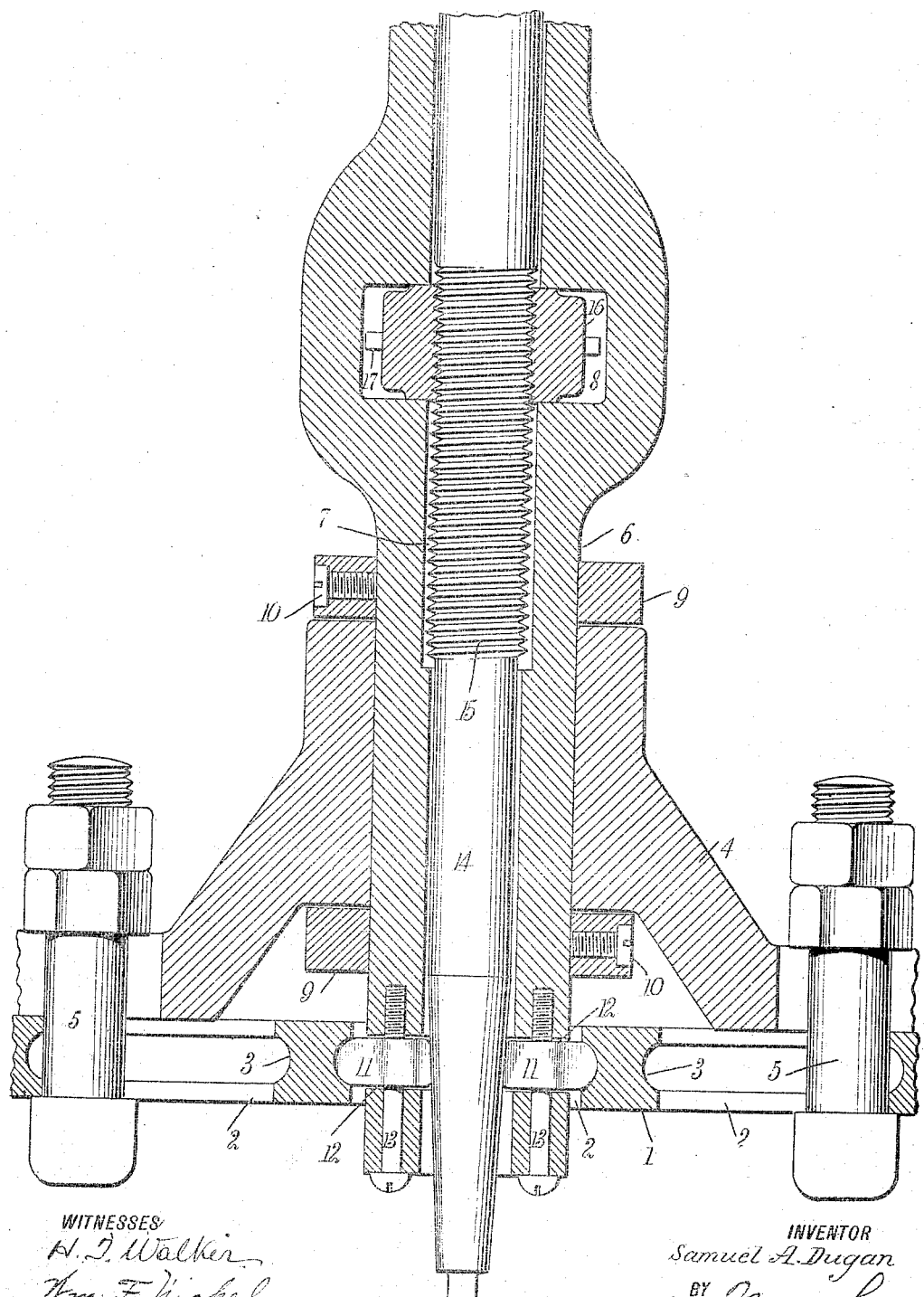

SAMUEL AUSTIN DUGAN, OF GORGONA, CANAL ZONE.

JOINTING APPARATUS FOR BOILER-TUBES.

1,078,615.

Specification of Letters Patent. Patented Nov. 18, 1913.

Application filed March 27, 1912. Serial No. 686,602.

*To all whom it may concern:*

Be it known that I, SAMUEL A. DUGAN, a citizen of the United States, and a resident of Gorgona, Canal Zone, Panama, have invented a new and Improved Jointing Apparatus for Boiler-Tubes, of which the following is a full, clear, and exact description.

My invention relates to devices for joining the tubes for steam boilers to the tube sheets, and it comprises certain improvements in this class of devices which will be fully set forth in the accompanying description and particularly pointed out in the claims appended thereto.

Reference is to be had to the accompanying drawings forming a part of this specification, in which the same characters of reference indicate the same parts throughout the view.

The figure is a vertical longitudinal section of a cutter forming a suitable hole in the tube sheet.

Referring particularly to the drawing, 1 represents the tube sheet of a boiler, in which are formed by punching or any other way a number of holes 2. The side walls of these holes are cut away to form annular grooves 3, and the tubes are fitted to the holes so formed so as to make up a joint that will effectually prevent any loosening of the tube, with consequent leakage in practice.

The cutter for forming the grooves 3 comprises a base 4 which is secured to the tube sheet by means of bolts or nuts 5, these bolts passing through the openings 3, as shown in the drawing. The base 4 is perforated to provide a bearing for a rotatable hollow shaft 6, which has a longitudinal bore 7 formed therein, and a recess 8. The hollow shaft 6 also carries a pair of collars 9, secured in place by binding bolts 10, one above and one below the base 4, in the position of the parts shown in the drawing, to prevent the shaft 6 from moving longitudinally in the base 4.

The working end of the shaft 6 carries a plurality of cutters 11 fitting in radial apertures 12. These cutters are slotted longitudinally and held in place by means of bolts 13. They are engaged at their inner ends and forced outward by the tapered end of a spindle 14 located in the bore 7 of the shaft 6, and having screw threads 15 thereon. These screw threads 15 engage a nut 16 in the recess 8, and this nut has projections 17 extending out through the sides of the recess to enable the same to be turned so as to adjust the relative position of the spindle 14.

It will be apparent that when the shaft 6 is turning, the cutter blades 11 will be turned with it to form the grooves 3, and as the tapered end of the spindle 14 is moved downward, referring to the position of the parts on the drawing, these cutter blades will be forced outward.

The depth of the grooves 3 will be made equal to the thickness of the tubes which are to have their ends inserted into the openings 2 to be joined to the sheet, and the cutter knives 11 are fed outward just to this extent. The end of the tapered section of the spindle 14 is squared and the spindle can be adjusted by engaging the nut 16 and the squared end with suitable tools and turning either the nut or the spindle, as preferred.

I wish to have it understood that the above description is illustrative only and that I do not care to be limited to the exact details of the arrangement therein shown and described, but wish to reserve to myself the right to make such changes in the shape, size and arrangement of the parts as fairly fall within the scope and spirit of my claims.

Having thus described my invention, I claim as new and desire to secure by Letters Patent:

1. Jointing apparatus for boiler tubes, comprising a hollow shaft, radially extensible cutters carried by said shaft, a spindle mounted in said hollow shaft and having a tapered section to engage the inner ends of said cutters and move the same outward, said spindle having screw threads thereon, an adjusting nut carried by said spindle and engaging said threads and located in a recess in said hollow shaft to control the position of said spindle with respect to the said shaft to move the cutters outward, and means for mounting said shaft in operative relation with respect to a perforated tube sheet, whereby when the shaft is turned a groove can be cut in the walls of the perforations of said tube sheet.

2. Jointing apparatus for boiler tubes, comprising a shaft, laterally-extending cutters carried by said shaft, means for mounting said shaft, said mounting means forming a bearing, collars on said shaft to prevent longitudinal movement thereof with respect to said bearing, and means for securing said mounting means to a perforated tube sheet, so that the said cutters can form grooves in the edges of the perforations in said sheet.

3. Jointing apparatus for boiler tubes, comprising a base, means for securing said base to a tube sheet having apertures therein, said base having a bearing, a shaft mounted therein, radially-extending cutters carried by said shaft and adapted to extend into the apertures, a spindle engaging said cutters to move them outward, said spindle having screw-threads thereon, and an adjusting nut carried by said spindle to engage said threads to control the position of said spindle with respect to the shaft to control the outward movement of said cutters, whereby when the shaft is turned a groove can be cut in the walls of the apertures.

In testimony whereof I have signed my name to this specification in the presence of two subscribing witnesses.

SAMUEL AUSTIN DUGAN.

Witnesses:
TALMAGE DYNES,
DAVID MACGOWAN.